C. N. JOHNSON.
FRUIT CLIPPER.
APPLICATION FILED NOV. 17, 1908.
917,609.
Patented Apr. 6, 1909.
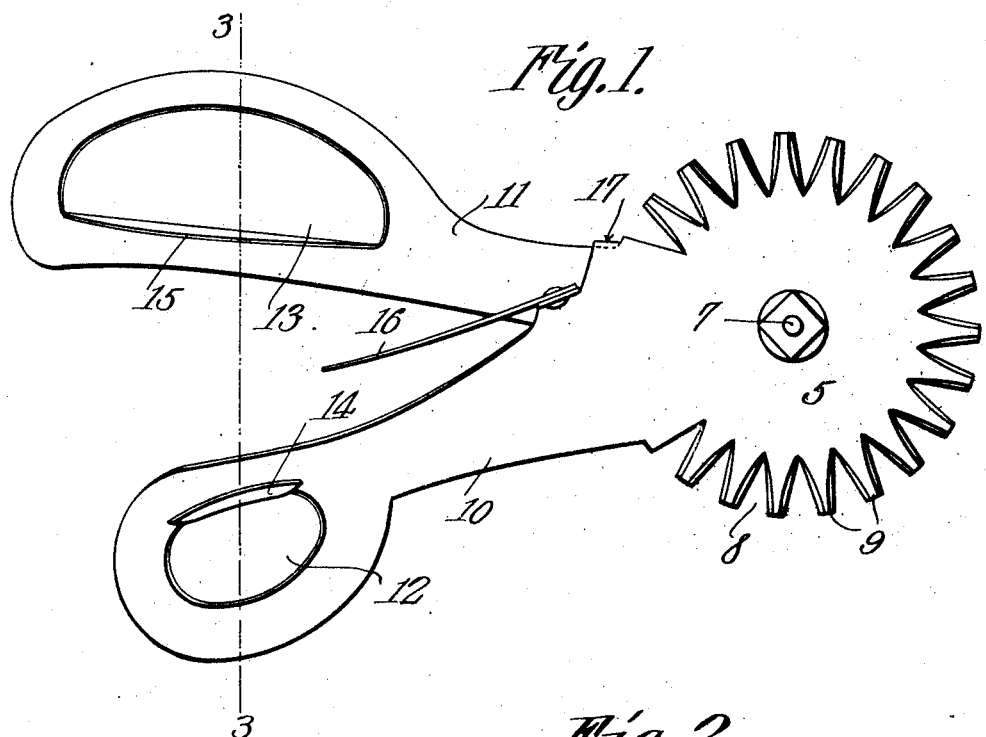
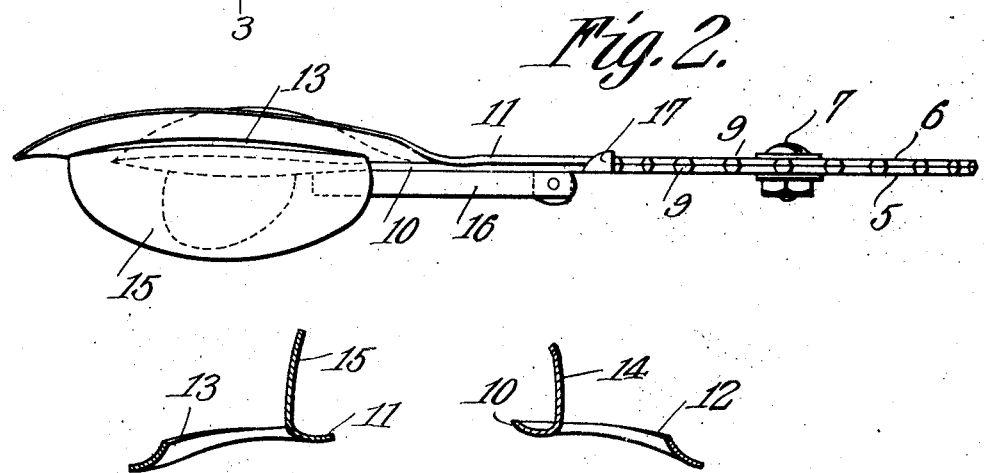
Witnesses
Inventor
Charles N. Johnson.
Attorneys

UNITED STATES PATENT OFFICE.

CHARLES NESTOR JOHNSON, OF TRAVERSE CITY, MICHIGAN.

FRUIT-CLIPPER.

No. 917,609.          Specification of Letters Patent.          Patented April 6, 1909.

Application filed November 17, 1908. Serial No. 463,093.

*To all whom it may concern:*

Be it known that I, CHARLES NESTOR JOHNSON, a citizen of the United States, residing at Traverse City, in the county of Grand Traverse and State of Michigan, have invented a new and useful Fruit-Clipper, of which the following is a specification.

The present invention relates to a clipper designed more particularly for picking cherries and other fruit which grows close together or in clusters, and the object of the invention is to provide a device of this kind which is simple in construction, and also one which can be easily operated, and which is rapid in action, it being so constructed that several cherries can be clipped with one stroke.

In the accompanying drawings:—Figure 1 is a plan view of the invention. Fig. 2 is an edge view of the same. Fig. 3 is a transverse section on the line 3—3 of Fig. 1.

The invention consists, broadly speaking, in a pair of superposed, rotatable, circular disks, each having a series of V-shaped notches in its periphery, forming a plurality of cutting blades, and operating handles connected to the disks. In the drawings the disks are indicated by the reference numerals 5 and 6 respectively. The disks are pivotally connected by a bolt 7, or other suitable means. The V-shaped notches 8 in the peripheries of the disks, are arranged to form a series of radially extending blades 9, having a cutting edge on each side, so that the device will cut when the disks are rotated in either direction.

From the disks 5 project operating handles 10 and 11 respectively, the former being provided with a thumb-hole 12, and the latter with a hole 13, for two or more fingers, these handles being similar to those of ordinary shears. From the inner edge of the thumb-hole 12 a guide flange 14 projects outwardly, and a similar flange 15 projects from the finger hole 13, and the handle, adjacent to these holes, is also suitably curved, in order that they may be conveniently grasped and operated without discomfort.

To the edge of the handle 10, opposite to the handle 11, is secured at one of its ends a flat spring 16, which is offset from one side of the handle 10 to clear the handles 11, but is in the path of the flange 15, and which engages said flange when the handles are closed, and thus serves to assist the opening movement thereof. By locating the spring as herein described, the clipper can be closed to a certain extent to make slight cuts, without bringing the spring into action. In making such slight cuts the spring is not necessary. However, when the handles are entirely closed or nearly so, to cut a thicker stem, the spring engages the flange 15 and is thus brought into action to assist the opening movement of the handles. At the junction of the disk 5 and the handle 10 is a finger 17, which projects in the direction of the handle 11 and is engageable by the outer edge thereof, and serves as a stop to limit the opening movement of the handles, by engaging the outer edge of said handle 11.

The clipper is operated by opening and closing the handles 10 and 11, both movements resulting in a cutting action. By reason of the double cutting edges on the blades 9, and by providing a plurality of blades, it will be seen that the clipper may be thrust into a cluster of cherries, and all of them clipped off, each pair of blades taking a stem. Inasmuch as the blades extend entirely around the disks, the clipper can be turned sidewise in each direction into the clusters of fruit, and it is therefore rapid in action. The stems, during the cutting operation, are not bunched together, so that there is no danger of the fruit being bruised. The blades are blunt at their outer ends, as clearly shown in Fig. 1, in order that the operator may not be injured in case he should fall.

It will be seen, from the foregoing, that I have provided a fruit clipper which is rapid and efficient in action, and which can be easily operated, and, by reason of the simplicity of its construction, it can be cheaply produced.

Having thus described my invention, what I claim as new, and desire to secure, by Letters Patent, is:—

1. A fruit clipper comprising superposed pivotally connected disks, each of said disks having a series of coöperating, radially projecting blades, operating handles projecting from the disks, a flat spring connected at one end to one of the handles, the free end of the spring being off-set from one side of said handle to clear the other handle, and a projection on the last-mentioned handle in the path of the spring.

2. A fruit clipper comprising superposed pivotally connected disks, each having a series of coöperating radially projecting blades, operating handles for the disks, and a finger projecting from one of the handles into the path of the outer edge of the other handle, to limit the opening movement of said handle.

In testimony that I claim the foregoing as my own, I have hereto affixed my signature in the presence of two witnesses.

CHARLES NESTOR JOHNSON.

Witnesses:
OSCAR A. JOHNSON,
S. W. SPENCER.